Patented Mar. 10, 1953

2,631,168

UNITED STATES PATENT OFFICE 2,631,168

POLYFUNCTIONAL HALOGENATED AROMATIC COMPOUNDS AND CONDENSATION PRODUCTS THEREOF

Sidney D. Ross and Moushy Markarian, North Adams, Mass., assignors to Sprague Electric Company, North Adams, Mass., a corporation of Massachusetts No Drawing. Application February 7, 1948, Serial No. 6,996

3 Claims. (Cl. 260—618)

Our present invention relates to a new class of condensable compounds and to novel condensation products made therefrom. More specifically, the invention concerns certain polyfunctional, halogenated, aromatic compounds and products obtained by condensing them with other compounds having at least one complementary functional group.

Resins used in lacquers, enamels and like coating compositions have for many years been made by condensing polybasic acids, such as phthalic and maleic, or their anhydrides, with polyhydric alcohols, such as glycerin and glycol. In more recent years there has been a tremendous development in the production of resinous products by the condensation of components each containing several functional groups that are complementary to (i. e., react readily with) each other. Outstanding in this development has been the production of fiber-forming resins of extremely high molecular weight by the condensation of dibasic acids with diamines. A great many variations have been made in the functional groups employed as well as in the radicals to which they are attached. In some cases complementary functional groups have been attached to the same radical, thus permitting self-condensation and dispensing with the need for a second component.

It is an object of our invention to produce new, polyfunctional halogenated aromatic compounds that are capable of being condensed with other compounds containing at least one complementary functional group to produce useful condensation products. A further object is to prepare novel resins by the condensation of our new condensable compounds with other suitable components. These novel resinous condensation products are characterized by flame resistance, high softening points, toughness and outstanding dielectric properties. Additional objects will become apparent from the following description and claims.

The foregoing objects are attained in accordance with our invention by producing certain halogenated aromatic compounds which are substituted by at least two alkylene groups, said alkylene groups being joined in turn to functional groups. Our invention also concerns the novel condensation products prepared by condensing such halogenated aromatic compounds with each other or with a different component having at least one complementary functional group. More particularly, our invention is concerned with bifunctional compounds in which the two functional groups are substituted on alkylene radicals containing up to six carbon atoms, which in turn are substituted on a benzene ring that is substituted by chlorine on each of its four remaining carbon atoms. The functional groups, such as hydroxyl or carboxyl, are not substituted directly on the ring carbons of the aromatic nucleus, but are displaced therefrom by at least one carbon atom of the alkylene radicals. We have found that by this expedient the halogen atoms occupying the remaining ring carbon positions will not inhibit the condensation reaction to any appreciable extent and at the same time will not give rise to unimolecular loss of hydrochloric acid, since halogen atoms and hydrogen atoms do not appear upon the same carbon atom or upon adjacent carbon atoms in our new condensable compounds.

The condensable compounds produced and employed in accordance with our invention conform to the general formula:

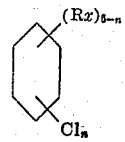

wherein R represents an alkylene radical, $x$ is a functional group selected from the class consisting of carboxyl, isocyanate, chloroformate, hydroxyl, thiol, and amino radicals, and $n$ is the integer 3 or 4.

Of specific interest in connection with our invention are compounds conforming to the general formula:

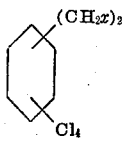

wherein $x$ has the same significance as above. These bi-functional compounds are particularly useful for the production of highly condensed, linear condensation products. Representative compounds falling within this category are alpha, alpha'-dihydroxy-tetrachloro-o-xylene; alpha, alpha'-dicarboxy-tetrachloro-p-xylene; alpha, alpha'-dithiol-tetrachloro-m-xylene; and alpha, alpha'-diamino-tetrachloro-o-xylene.

An outstanding feature of our new condensable compounds is that each functional group is removed from the aromatic nucleus by at least one carbon atom of an alkylene radical. Another characteristic feature is that the remaining positions on the aromatic nucleus are all substituted by halogen atoms. We generally utilize a benzene nucleus substituted by two or three alkylene radicals bearing functional groups, the remaining positions of which are substituted by chlorine. In the preferred embodiment of our invention the condensable compound is bi-functional and the two alkylene radicals are methylene.

In the case of the bi-functional compounds containing a benzene ring, the alkylene radicals may be substituted in ortho-para- or meta-positions. In several respects the ortho-position is to be preferred, particularly for electrical purposes, since a higher dipole moment is attained. Notwithstanding the proximity of the two groups, it is possible to completely react and condense such compounds, due to the presence of the intervening alkylene radicals. In the case of the para-substituted compounds, the structure of the condensation products is more linear in nature and, as a general rule, somewhat lower dielectric constants are observed. Mixtures of the various isomers may be used for many purposes.

Our new compounds undergo condensation with appropriate reactants containing complementary functional groups to produce condensation products having unusual chemical, physical and electrical properties. Usually the functional groups in our compounds are all alike, but this is not necessary. In case they contain different functional groups that are complementary to each other, it is possible to effect self-condensation.

When preparing novel condensation products for our new condensable compounds, we prefer to employ polyfunctional compounds as the other reaction component. Here again the functional groups in such other component are generally, though not necessarily, all the same. They must, of course, be complementary to the functional groups contained in our new condensable compounds, in order to assure the desired reaction. While the other component is preferably polyfunctional, it may also contain but a single complementary functional group, in which case the condensation products formed are of relatively low molecular weight.

Among the types of reactants with which our new condensable compounds having carboxyl, isocyanate and/or chloroformate radicals as functional groups may be condensed are the complementary functional groups of alcohols, mercaptans (thiols) and amines. As examples of such polyfunctional reactants there may be mentioned ethylene glycol, propylene glycol, butylene glycol, diethylene glycol, triethylene glycol, dipropylene glycol, dimethyloldimethylmethane, 2-mercaptoethanol, di-hydroxyethyl sulfide, glycerol, trimethylolethylmethane, d-sorbitol, d-sorbose, mannitol, hydroxyethyl cellulose, propylene dimercaptan, and hexamethylene diamine.

In case hydroxyl, thiol and/or amino radicals constitute the functional groups in our new compounds, they may be reacted with acids, acid anhydrides and acid chlorides. Among the polyfunctional acids suitable as such reactants are the following: succinic acid, sebacic acid, adipic acid, pimelic acid, suberic acid, azelaic acid, undecanedioic acid, dodecanedioic acid, tetradecanedioic acid, octadecanedioic acid, agathic acid, phthalic acid, and terephthalic acid. The anhydrides, such as maleic anhydride and phthalic anhydride, and the chlorides of the foregoing acids may also be used.

As in the case of our new condensable compounds, all functional groups of the polyfunctional reactants to be condensed therewith are generally the same. However, it is also possible to employ reactants containing two or more different functional groups. For example, hydroxy alkyl mercaptans, long chain amino alcohols and amino alkyl mercaptans may be used.

As a general rule, we prefer to produce our novel resinous condensation products by reacting two or more bi-functional components. It is possible in this way to obtain linear condensation products of very high molecular weight. However, tri-, tetra- and higher functional components may be employed with good results, producing as the number of functional groups increases harder resins with higher softening points. Furthermore, as previously indicated, monofunctional components may be reacted with our new condensable compounds to produce condensation products of relatively low molecular weight.

The condensation of our polyfunctional halogenated aromatic compounds may be effected in the usual manner by heating the reactants, preferably to temperatures in the order of from 150 to 200° C. The reaction proceeds rapidly during the early stages of heating and gradually slows down thereafter. It may be accelerated by the addition of condensing agents, such as anhydrous zinc chloride. Exceptionally high molecular weights may be achieved by heating the partially condensed reaction mixture at temperatures above 200° C. under greatly reduced pressure. Generally speaking we employ proportions of the reactants that are calculated to be required for complete reaction between the complementary functional groups. Thus, in case both reactants are bi-functional, we customarily employ equimolecular proportions. However, in some cases it may prove desirable to employ an excess of one of the reactants.

The resinous condensation products obtained according to our invention are useful in varied fields. For electrical purposes their flame resistance, high softening point and excellent dielectric properties make them suitable for the coating of various electrical conductors and the impregnation of porous dielectric separators, such as paper. Partially condensed resins, particularly of such reactants that do not evolve water upon condensation, may be used as potting compounds for casting about electrical assemblies and other devices wherein ultimate physical and chemical protection, as well as electrical insulation, are required. Some of the low molecular weight resins prepared according to our invention are tacky and soft at room temperatures and may be used as plasticizers for a wide variety of natural and synthetic resins. The very high molecular weight resins, particularly those of linear character obtainable by condensation of bi-functional components, may be extruded in molten condition through spinning orifices and stretched to form fibers that are highly useful for various textile purposes.

The following examples will serve to illustrate the preparation of our new condensable compounds and their employment for the production of novel condensation products. Obviously, our invention is not limited to the details given in these specific examples, since the materials employed and the reaction conditions may be varied widely within the scope of the preceding general disclosure.

EXAMPLE I

Preparation of tetrachloro-ortho-xylene 212 grams of o-xylene and 10 grams of aluminum chloride were placed in a 1 liter, 3 necked flask provided with agitation, a thermometer and a dropping funnel. A solution comprising 1280 grams of sulfuryl chloride and 12.8 grams of sulfur chloride was dropped in through the funnel. The temperature was maintained at 25–30° C. until half of the chlorinating mixture had been added. At that point, the temperature was allowed to increase to the reflux point and held there until the chlorination was completed.

The excess chlorinating material was removed by distillation under a water pump vacuum. The residue was washed with water and distilled at room temperature, the product melting over a range of 175–205° C. Upon recrystallization there were obtained 226 grams of tetrachloro-o-xylene having a melting point of 223–226° C.

Analysis:
Calcd. for $C_8H_6Cl_4$: C, 39.35; H, 2.46
Found: C, 39.15, 39.01; H, 2.39, 2.50

EXAMPLE II

Preparation of $x, x^1$-dibromo-tetrachloro-o-xylene 488 grams of tetrachloro-o-xylene, prepared as in Example I, and 1500 cc. of carbon tetrachloride were placed in a flask equipped with a stirrer, reflux condenser and dropping funnel. Agitation was begun with the flask illuminated by a 500 watt bulb. A total of 640 grams of bromine was added in small batches, with decolorization taking place between addition of the batches.

The carbon tetrachloride excess, bromine and hydrobromic acid were distilled off until the liquid reached 110° C. The residue was pressed dry on a filter paper and crystallized from 2 liters of acetone-methanol (4–1). This gave 762 grams (94.8%) of the dibromide, M. P. 114.5–116° C. A sample crystallized three times from denatured alcohol-carbon tetrachloride (2–1) and once from acetone melted at 115.5–116.5° C.

Analysis:
Calcd. for $C_8H_4Cl_4Br_2$: C, 23.88; H, 1.00
Found: C, 23.99, 24.08; H, 1.01, 1.08

EXAMPLE III

Preparation of 1,2-bis-acetoxymethyl-3,4,5,6-tetrachlorobenzene 40.1 grams of the dibromide of Example II were refluxed for 24 hours with 100 grams of potassium acetate and 300 cc. of glacial acetic acid. The product was poured into water and filtered to remove the desired precipitate. The latter was dried to give 34 grams of a product melting at 130–133.5° C. Three crystallizations from ethanol brought the melting point to 133.5–134.5° C.

Analysis:
Calcd. for $C_{12}H_{10}O_4Cl_4$: C, 40.01; H, 2.80.
Found: C, 39.69, 39.87; H, 2.67, 2.79

EXAMPLE IV

Preparation of 1,2-bis-hydroxymethyl-3,4,5,6-tetrachlorobenzene 32 grams of the 1,2-bis-acetoxymethyl-3,4,5,6-tetrachlorobenzene of Example III were refluxed with 11.2 grams of KOH, 100 cc. of water and 150 cc. of acetone for 6 hours. The product was poured into water and dried to obtain 23 grams of the dihydroxy compound melting at 210–215° C. Two crystallizations (from an alcohol-carbon tetrachloride mixture) brought the melting point to 226.5–227.5° C.

Analysis:
Calcd. for $C_8H_6O_2Cl_4$: C, 34.80; H, 2.18
Found: C, 35.02, 34.83; H, 2.08, 1.89

By a series of steps similar to those described in the foregoing examples, starting with p-xylene instead of o-xylene, one may produce the isomeric 1,4-bis-hydroxymethyl-2,3,5,6-tetrachlorobenzene. The latter may be employed in place of the 1,2-bis-hydroxymethyl-2,3,5,6-tetrachlorobenzene in the following examples.

EXAMPLE V

Condensation of 1,2-bis-hydroxymethyl-3,4,5,6-tetrachlorobenzene with adipic acid 6.9 grams (.025 mole) of the bis-hydroxy compound of Example IV was condensed with 3.7 grams (.025 mole) of adipic acid in the presence of a trace of anhydrous zinc chloride. The temperature was held at 200–210° C. for 2 hours, and the material then placed under water pump vacuum for two additional hours at 220–230° C. At the end of this period the material was heated at 220–230° C. under a pressure of 1–2 mm. Hg. The reaction product was poured onto a watch glass while still hot and solidified to a hard, brown resin. The resin will melt and catch fire when exposed to the flame of a Bunsen burner, but will not sustain the flame upon removal of the Bunsen burner.

EXAMPLE VI

Condensation of 1,2-bis-hydroxymethyl-3,4,5,6-tetrachlorobenzene with the 2,4-di-isocyanate of toluene 1 gram of the glycol of Example IV was reacted with 2 cc. of toluene-2,4-di-isocyanate on a hot plate. At the end of 3 minutes, a dark, hard resin was obtained.

EXAMPLE VII

Condensation of 1,2-bis-hydroxymethyl-3,4,5,6-tetrachlorobenzene with terephthalic acid The procedure of Example V was followed, using 4.15 grams of terephthalic acid in place of the adipic acid. A hard, brown resin was obtained.

EXAMPLE VIII

Condensation of 1,2-bis-hydroxymethyl-3,4,5,6-tetrachlorobenzene with succinic acid The procedure of Example V was followed, using 2.96 grams of succinic acid in place of the adipic acid. A brownish, hard resin was obtained.

EXAMPLE IX

Condensation of 1,2-bis-hydroxymethyl-3,4,5,6-tetrachlorobenzene with hexamethylene-di-isocyanate The procedure of Example V was followed, using 3.2 grams of hexamethylene-di-isocyanate in place of the adipic acid. A hard, brown resin was obtained. This condensation does not result in the formation and evolution of water. Thus, the resin may be utilized in its partially condensed state, or even as a monomeric mixture, as an impregnant or potting compound for water sensitive devices, such as electrical transformers.

The resin described in Example V was dissolved in dioxane, in which it is slightly soluble, and the solution applied to a copper wire. The wire was passed through the resin solution and an oven a number of times to give a final resin coating thickness of .00025 inch. Upon twisting two pieces of coated wire together, the voltage breakdown was determined and found to be 370 volts per mil. The insulation was resistant to abrasion and reasonably flexible. The insulation would not sustain flame.

While the foregoing examples are concerned with the preparation and use of bis-hydroxymethyl compounds of the invention, it is apparent that the corresponding tri-functional compounds may be similarly prepared and condensed according to our invention. The hydroxyl groups may readily be converted to other functional groups by various chemical reactions, some of which are described below, and the resultant products may be condensed with reactants containing complementary functional groups.

The di-chloroformate of the 1,2-bis-hydroxymethyl-3,4,5,6-tetrachlorobenzene may be prepared by treating the glycol with phosgene in an inert solvent. The 1,2-bis-carboxymethyl-2,4,5,6-tetrachlorobenzene may be obtained by reacting the product of Example II with KCN in aqueous acetone to form the dinitrile, followed by acidic or alkaline hydrolysis. The corresponding dithiol may be obtained by heating the dibromide of Example II with KHS in acetone. The diamine may be obtained by treating the di-carboxylic acid with $HN_3$ (hydrazoic acid). The di-isocyanate may be obtained by treating the diamine with phosgene. Obviously similar conversions of the functional groups may be effected with the 1,3- and 1,4-bis-hydroxymethyl compounds according to our invention, as well as with the various tri-hydroxymethyl-trichlorobenzenes. Other methods of synthesizing our novel type of bi-functional, halogenated, aromatic compounds will be apparent to those skilled in the art.

As previously pointed out, the compounds of the invention are characterized by the high chlorine content, by the ability to condense readily despite the halogen content, and by the excellent chemical, physical and electrical properties of condensation polymers made therefrom. The condensation polymers described herein are useful in a wide variety of fields. As wire enamels and coating lacquers generally, the resins are of utility because of the high softening point, the flame resistance and, in many cases, the resistance to solvents which would normally attack condensation polymers. Certain of the resins are useful as plasticizers for more brittle and fragile resins. Their use with phenol-formaldehyde condensation resins leads to increased adherence of the cured resin to metal surfaces, as well as improved physical properties. In applications of this type, the partially or fully cured resins of the invention are added to the phenolic molding powder.

The condensation polymers may be used in the fabrication of thin filaments and threads useful in the production of flame resistant fabrics.

As many apparently widely different embodiments of this invention may be made without departing from the spirit and scope hereof, it is to be understood that the invention is not limited to the specific embodiments hereof except as defined in the appended claims.

What we claim is:

1. Bis-hydroxymethyl-tetrachlorobenzene.
2. A compound conforming to the general formula:

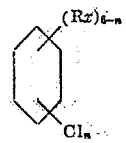

wherein R represents an alkylene radical, each $x$ is a functional group selected from the condensation-effecting class consisting of carboxyl, isocyanate and chloroformate radicals, and the complementary condensation-effecting class consisting of —OH, —SH, and —$NH_2$ radicals, and $n$ is an integer from 3 to 4.

3. A compound conforming to the general formula:

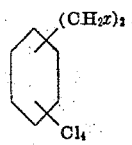

wherein $x$ is a functional group selected from the the condensation-effecting carboxyl, isocyanate and chloroformate radicals, and the complementary condensation-effecting —OH, —SH, and —$NH_2$ radicals.

SIDNEY D. ROSS.
MOUSHY MARKARIAN.

REFERENCES CITED

The following references are of record in the file of this patent:

UNITED STATES PATENTS

| Number | Name | Date |
|---|---|---|
| 1,950,468 | Zwilgmeyer | Mar. 13, 1934 |
| 2,048,774 | Bolton | July 28, 1936 |
| 2,370,394 | Cass | Feb. 27, 1945 |
| 2,385,789 | Bruson | Oct. 2, 1945 |
| 2,399,716 | Adams | May 7, 1946 |
| 2,443,887 | Bohrer | June 22, 1948 |
| 2,489,363 | Bersworth | Nov. 29, 1949 |

OTHER REFERENCES

Granger, Industrial and Eng. Chem., vol. 24, pp. 442–48 (Apr. 1932), 7 pages.